US010378987B2

(12) United States Patent
Hershey et al.

(10) Patent No.: US 10,378,987 B2
(45) Date of Patent: Aug. 13, 2019

(54) PRESSURE SENSOR WITH FLOW PORTING HAVING INTEGRAL FLAME-PROOF SAFETY MECHANISM

(71) Applicant: Honeywell International Inc., Morris Plains, NJ (US)

(72) Inventors: George Hershey, Blue Bell, PA (US); Richard D. Daugert, Doylestown, PA (US); Ronald E. Beselt, Burnaby (CA)

(73) Assignee: Honeywell International Inc., Morris Plains, NJ (US)

( * ) Notice: Subject to any disclaimer, the term of this patent is extended or adjusted under 35 U.S.C. 154(b) by 140 days.

(21) Appl. No.: 15/632,059

(22) Filed: Jun. 23, 2017

(65) Prior Publication Data
US 2018/0259416 A1    Sep. 13, 2018

Related U.S. Application Data

(60) Provisional application No. 62/469,716, filed on Mar. 10, 2017, provisional application No. 62/469,954, (Continued)

(51) Int. Cl.
G01L 7/08    (2006.01)
G01L 19/06    (2006.01)
G01L 19/14    (2006.01)
G01L 13/02    (2006.01)
G01L 11/00    (2006.01)
G01L 15/00    (2006.01)

(52) U.S. Cl.
CPC ............ *G01L 19/0618* (2013.01); *G01L 7/08* (2013.01); *G01L 7/082* (2013.01); *G01L 11/004* (2013.01);
(Continued)

(58) Field of Classification Search
CPC .......... G01L 7/08; G01L 7/082; G01L 11/00; G01L 11/004; G01L 13/02; G01L 13/026;
(Continued)

(56) References Cited

U.S. PATENT DOCUMENTS 4,072,058 A * 2/1978 Whitehead, Jr. ...... G01L 9/0054
73/706
4,539,850 A   9/1985 Ziegler
(Continued)

FOREIGN PATENT DOCUMENTS

EP    0636243 B1    8/1997
JP    05079871 A *  3/1993  ............ G01F 1/363
(Continued)

OTHER PUBLICATIONS

Honeywell; "ST 800 SmartLine Pressure Transmitters User's Manual"; 34-ST-25-35 Revision 10; Jul. 2016; 122 pages.
(Continued)

*Primary Examiner* — Nguyen Q. Ha
(74) *Attorney, Agent, or Firm* — Loza & Loza LLP; Luis M. Ortiz; Kermit D. Lopez

(57) ABSTRACT

An apparatus includes a sensor body and a sensor configured to measure pressure. The apparatus also includes at least one pressure input in or on the sensor body, where the at least one pressure input is configured to provide at least one input pressure to the sensor. The apparatus further includes multiple fluid passages configured to convey the at least one input pressure from the at least one pressure input to the sensor using a fill fluid. The multiple fluid passages are configured to both (i) transport the fill fluid and (ii) absorb thermal energy in a flame created by the sensor before the flame exits the sensor body. The fluid passages can include long and narrow straight passages, long and narrow curved or helical passages, and turns or bends. The fluid passages can have small cross-sections relative to their lengths.

20 Claims, 6 Drawing Sheets

Related U.S. Application Data filed on Mar. 10, 2017, provisional application No. 62/470,080, filed on Mar. 10, 2017, provisional application No. 62/470,089, filed on Mar. 10, 2017.

(52) U.S. Cl.
CPC ........ *G01L 13/026* (2013.01); *G01L 19/0645* (2013.01); *G01L 19/0663* (2013.01); *G01L 19/14* (2013.01); *G01L 15/00* (2013.01)

(58) Field of Classification Search
CPC ..... G01L 15/00; G01L 19/06; G01L 19/0618; G01L 19/0663
See application file for complete search history.

(56) References Cited

U.S. PATENT DOCUMENTS

| | | | | |
|---|---|---|---|---|
| 4,970,898 A | * | 11/1990 | Walish | ............... G01L 19/0038 73/706 |
| 5,287,746 A | * | 2/1994 | Broden | ............... G01L 13/026 73/706 |
| 5,415,233 A | | 5/1995 | Roussakis et al. | |
| 5,469,749 A | * | 11/1995 | Shimada | ................ G01F 1/363 73/721 |
| 5,583,294 A | | 12/1996 | Karas | |
| 6,662,662 B1 | | 12/2003 | Nord et al. | |
| 2012/0234097 A1 | * | 9/2012 | Petersen | ............ G01L 19/0645 73/706 |
| 2014/0209220 A1 | | 7/2014 | Otomo et al. | |

FOREIGN PATENT DOCUMENTS

| | | |
|---|---|---|
| WO | 2012047998 A2 | 4/2012 |
| WO | 2014051679 A1 | 4/2014 |

OTHER PUBLICATIONS

International Search Report and Written Opinion of the International Searching Authority for International Patent Application No. PCT/US2018/021463 dated Jun. 20, 2018, 14 pages.

* cited by examiner

PRESSURE SENSOR WITH FLOW PORTING HAVING INTEGRAL FLAME-PROOF SAFETY MECHANISM

CROSS-REFERENCE TO RELATED APPLICATIONS AND PRIORITY CLAIM

This application claims priority under 35 U.S.C. § 119(e) to the following U.S. provisional patent applications:
- U.S. Provisional Patent Application No. 62/469,716 filed on Mar. 10, 2017;
- U.S. Provisional Patent Application No. 62/469,954 filed on Mar. 10, 2017;
- U.S. Provisional Patent Application No. 62/470,080 filed on Mar. 10, 2017; and
- U.S. Provisional Patent Application No. 62/470,089 filed on Mar. 10, 2017.

All of these provisional applications are hereby incorporated by reference in their entirety.

TECHNICAL FIELD

This disclosure generally relates to pressure sensors. More specifically, this disclosure relates to a pressure sensor with flow porting having an integral flame-proof safety mechanism.

BACKGROUND

Pressure transmitters are routinely used in industrial processes and other systems to capture pressure measurements. For Health, Safety, and Environmental (HS&E) purposes, it is often a requirement that a pressure transmitter meter body be flame-proof (also known as explosion-proof or "Ex d"). An energized device such as a pressure transmitter meter body is considered to be flame-proof when the device can both (i) contain the pressure generated by an explosive gas mixture being ignited within the device itself and (ii) prevent an explosion flame front from escaping the device. The ability to contain the pressure generated by an explosion and the ability to prevent the flame front from leaving the device help to ensure that no explosive gas mixture outside the device would be ignited. This can be particularly important in industrial processes or other systems where an explosive gas mixture may exist in the ambient environment surrounding the device, such as in an oil and gas refinery.

Pressure containment can normally be achieved by the construction of pressure transmitter meter bodies themselves, which are designed to contain pressure as part of their normal operation in measuring pressure. One conventional technique for containing flame fronts is to attenuate the thermal energy in a flame prior to the flame front being able to leave the device, thereby extinguishing the flame and preventing any external explosive gas mixtures from igniting. For example, some conventional pressure sensors utilize special add-on components called "flame arrestors" to contain flame fronts. However, the flame arrestors occupy valuable space within a pressure sensor and often require machining of special features to hold the flame arrestors, which increases manufacturing and assembly costs.

SUMMARY

This disclosure provides a pressure sensor with flow porting having an integral flame-proof safety mechanism.

In a first embodiment, an apparatus includes a sensor body and a sensor configured to measure pressure. The apparatus also includes at least one pressure input in or on the sensor body, where the at least one pressure input is configured to provide at least one input pressure to the sensor. The apparatus further includes multiple fluid passages configured to convey the at least one input pressure from the at least one pressure input to the sensor using a fill fluid. The multiple fluid passages are configured to both (i) transport the fill fluid and (ii) absorb thermal energy in a flame created by the sensor before the flame exits the sensor body.

In a second embodiment, a system includes a manifold and a pressure sensor mounted to the manifold. The pressure sensor includes a sensor body and a sensor configured to measure pressure. The pressure sensor also includes at least one pressure input in or on the sensor body, where the at least one pressure input is configured to provide at least one input pressure to the sensor. The pressure sensor further includes multiple fluid passages configured to convey the at least one input pressure from the at least one pressure input to the sensor using a fill fluid. The multiple fluid passages are configured to both (i) transport the fill fluid and (ii) absorb thermal energy in a flame created by the sensor before the flame exits the sensor body.

In a third embodiment, a method includes providing at least one input pressure to a sensor from at least one pressure input in or on a sensor body. The method also includes generating a pressure measurement using the sensor based on the at least one input pressure. Providing the at least one input pressure includes transporting fill fluid through multiple fluid passages configured to convey the at least one input pressure from the at least one pressure input to the sensor. The multiple fluid passages are configured to both (i) transport the fill fluid and (ii) absorb thermal energy in a flame created by the sensor before the flame exits the sensor body.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
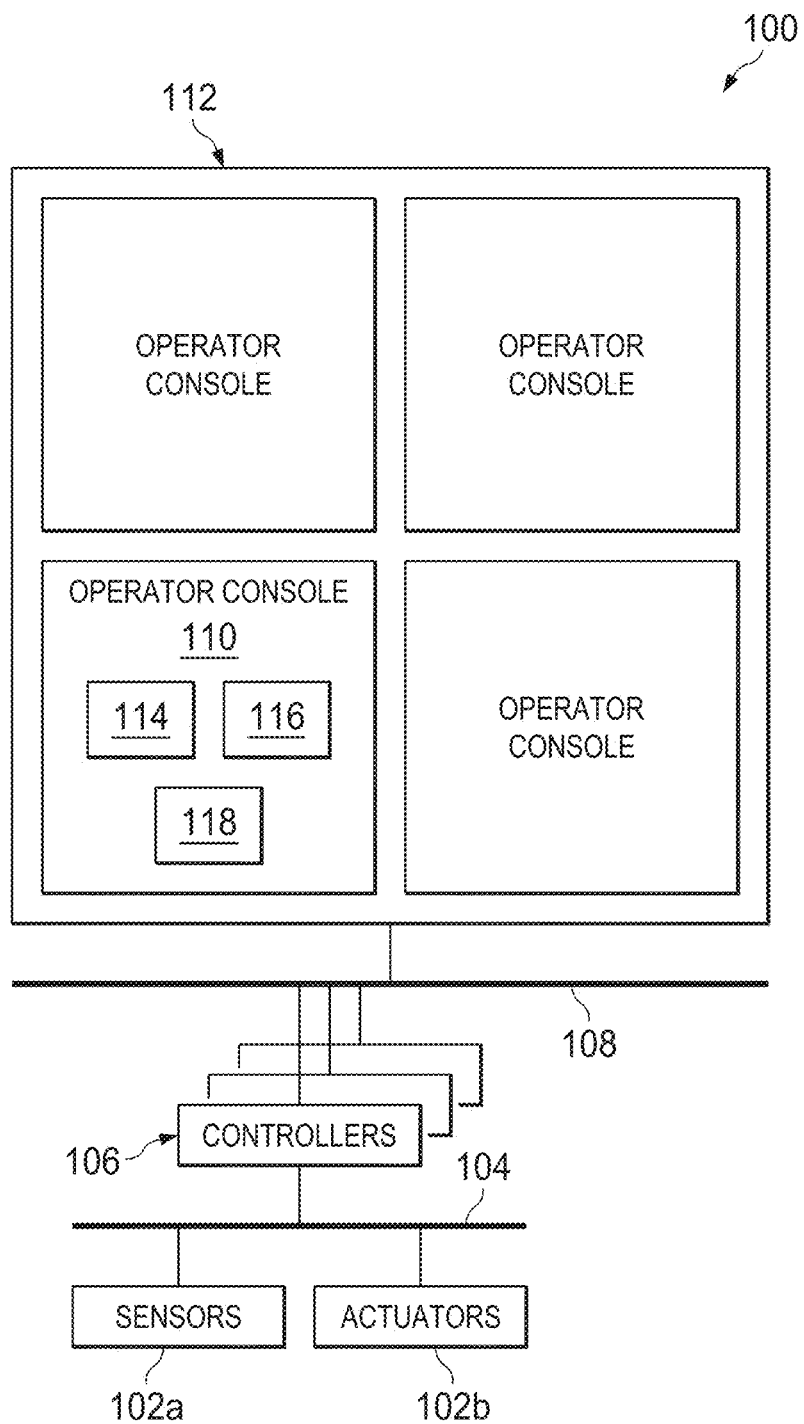
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

At least one of the sensors 102a in FIG. 1 could represent a pressure sensor. As noted above, a pressure sensor often needs to be flame-proof (explosion-proof or "Ex d"). In accordance with this disclosure, a pressure sensor meter body incorporates a number of unique internal flow paths that are used to transfer process pressure to a sensor, and these flow paths are also designed to comply with suitable flame-proof requirements. For example, a potential explosion within the meter body could be caused by an explosive gas mixture reaching an electronic sensor and igniting. The design of the pressure sensor meter body can help to ensure that the pressure generated by an explosion within the pressure sensor is contained within the pressure sensor. Also, the unique flow paths in the pressure sensor meter body help to ensure that a flame front is extinguished by absorbing the thermal energy in a flame before the flame is able to exit the meter body (either to an industrial process or to the outside ambient environment).

Among other things, the pressure sensor utilizes a unique meter body construction that has thick walls relative to the internal volume that an explosive gas mixture can encompass. Also, the meter body includes flow paths that are circuitous or helical in nature or include sharp turns and that have relatively small cross-sections relative to their lengths. These design features enable cost-effective and highly accurate performance of the pressure sensor while also supporting an integral flame-proof safety mechanism within the pressure sensor. Thus, the pressure sensor can inherently satisfy flame-proof requirements based on its design and avoid the need for special features like flame arrestors that can occupy space and increase manufacturing and assembly costs.

Additional details regarding a pressure sensor with flow porting having an integral flame-proof safety mechanism are provided below. Note that these details relate to specific implementations of the pressure sensor and that other implementations could vary as needed or desired.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
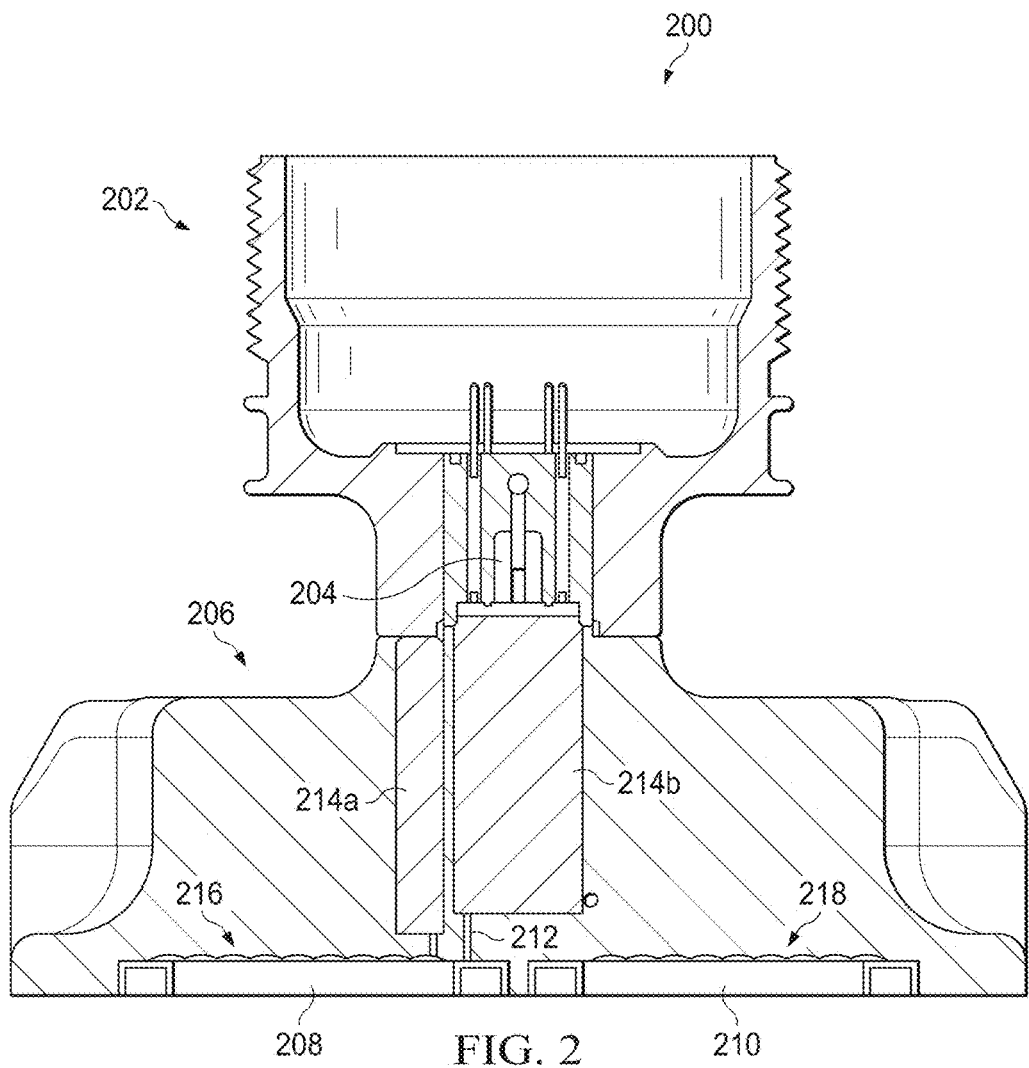
FIG. 2 illustrates an example pressure sensor according to this disclosure.

FIG. 2 illustrates an example pressure sensor 200 according to this disclosure. For ease of explanation, the pressure sensor 200 may be described as being used in the industrial process control and automation system 100 of FIG. 1. However, the pressure sensor 200 could be used in any other suitable system, and the system need not relate to industrial process control and automation.

As shown in FIG. 2, the pressure sensor 200 includes an adapter 202 and at least one sensor 204. The adapter 202 denotes a portion of the pressure sensor 200 in which wires or other signal conductors can be connected to the sensor 204. The outer surface of the adapter 202 can also be threaded or otherwise configured to facilitate attachment of the pressure sensor 200 to a larger device or system. The adapter 202 could be formed from any suitable material(s) and in any suitable manner. As a particular example, the adapter 202 could be formed from metal.

The sensor 204 denotes a structure that senses one or more input pressures and that outputs at least one signal based on the input pressure(s). For example, the sensor 204 could output an electrical signal whose voltage or current varies proportionally with a single pressure or with a differential pressure. The sensor 204 includes any suitable pressure sensor, such as a piezo-resistive or capacitive sensor. Multiple sensors 204 could also be used, such as sensors that output both differential and static pressure measurements. Also, the multiple sensors 204 may or may not be implemented on a single integrated circuit chip. Each sensor 204 includes any suitable structure for measuring pressure.

The pressure sensor 200 also includes a coplanar body 206, which denotes a portion of the pressure sensor 200 in which multiple pressure inputs are located. The pressure inputs are generally located on a common plane, which is why the body 206 is referred to as a "coplanar" body. The coplanar body 206 could be formed from any suitable material(s) and in any suitable manner. As a particular example, the coplanar body 206 could be formed from metal. Note that the adapter 202 and the coplanar body 206 could be formed integrally or as separate pieces that are connected together, such as by welding.

The pressure inputs in the pressure sensor 200 are implemented using a high-pressure barrier diaphragm 208 and a low-pressure barrier diaphragm 210. Each of the barrier diaphragms 208 and 210 represents a barrier that allows pressure to be transmitted into the pressure sensor 200 while preventing process fluid (such as oil, gas, or other high pressure and corrosive fluid) from entering into the pressure sensor 200. The barrier diaphragms 208 and 210 represent flexible membranes that can move up or down in FIG. 2 based on the amount of pressure applied to the barrier diaphragms 208 and 210.

Each of the barrier diaphragms 208 and 210 denotes any suitable flexible membrane, such as a metallic membrane. Each of the barrier diaphragms 208 and 210 could also have any suitable size, shape, and dimensions. In particular embodiments, the barrier diaphragms 208 and 210 are small enough and spaced apart to fit within the established bolt pattern for industry-standard DIN manifolds. This allows the pressure sensor 200 to be mounted directly to a manifold.

Pressures from the barrier diaphragms 208 and 210 are transmitted to the sensor 204 via a fill fluid that travels through various passages 212. The fill fluid could denote an incompressible fluid, so pressure applied by the barrier diaphragm 208 or 210 is conveyed by the fill fluid to the sensor 204. The fill fluid denotes any suitable fluid for conveying pressure, such as silicone oil or other suitable fluid. Each passage 212 denotes any suitable passageway for fill fluid.

The pressure sensor 200 may optionally contain fluid expansion compensation elements 214a-214b, which are used to reduce the thermal expansion effect of the fill fluid. In some embodiments, it may be necessary or desirable to reduce or minimize the fluid travel of the fill fluid through the passages 212. However, this may be complicated by the need to operate the pressure sensor 200 over a large temperature range. Since the fluid expansion properties of the fill fluid may greatly exceed those of the body 206, this results in a larger volume of fluid as the temperature increases. To help handle this issue, the fluid expansion compensation elements 214a-214b can be used and denote cylindrical or other components that encircle or surround various ones of the passages 212. The fluid expansion compensation elements 214a-214b can be formed using a low thermal expansion material, such as INVAR (FeNi36 or 64FeNi) or other material with low thermal expansion as compared to the material of the coplanar body 206.

Each barrier diaphragm 208 and 210 has an associated overload or overpressure protection mechanism 216 and 218, respectively. The protection mechanisms 216 and 218 generally provide protection against overpressure conditions that can damage the pressure sensor 200. Here, the protection mechanisms 216 and 218 implement separate protection for the sensor 204. Each of the protection mechanisms 216 and 218 includes any suitable structure for providing structural reinforcement and overpressure protection. Each of the protection mechanisms 216 and 218 could, for instance, denote an overload diaphragm that can move, where the associated barrier diaphragm 208 or 210 can nest against the protection mechanism 216 or 218 to prevent further movement of the barrier diaphragm 208 or 210.

As described in more detail below, the pressure sensor 200 includes unique flow paths (such as the passages 212) that are used by the fill fluid to transfer process pressure to the sensor 204. These flow paths also allow the pressure sensor 200 to comply with suitable flame-proof requirements.

Although FIG. 2 illustrates one example of a pressure sensor 200, various changes may be made to FIG. 2. For example, the sizes, shapes, and relative dimensions of the components in FIG. 2 are for illustration only. Also, other arrangements of the components in FIG. 2 could be used in a pressure sensor. In addition, the overall form factor for the pressure sensor 200 could vary as needed or desired, and the features used to comply with flame-proof requirements described in this patent document could be used in other pressure sensors (including non-differential pressure sensors).

Figure 3:
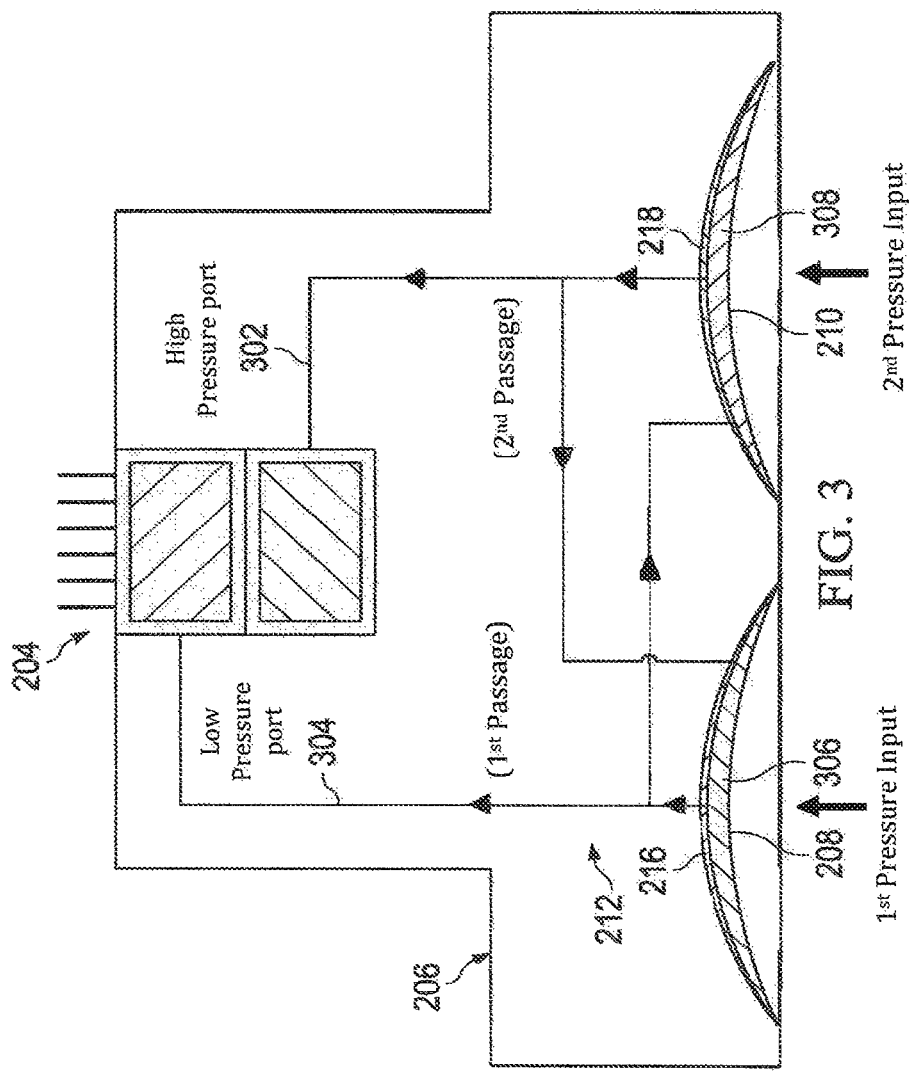
FIG. 3 illustrates example operation of a pressure sensor according to this disclosure.

FIG. 3 illustrates example operation of a pressure sensor according to this disclosure. For ease of explanation, the operations shown in FIG. 3 are described with respect to the differential pressure sensor 200 of FIG. 2. However, these operations could occur using any other suitable pressure sensor.

As shown in FIG. 3, internal porting is implemented in the body 206 using the passages 212 to transfer two pressure inputs to the sensor 204. A high-pressure port 302 provides a higher-pressure input to the sensor 204, and a low-pressure port 304 provides a lower-pressure input to the sensor 204. A fill fluid 306 fills a gap between the barrier diaphragm 208 and the protection mechanism (overload diaphragm) 216. The fill fluid 306 is ported via the port 304 to both the low-pressure side of the sensor 204 and a gap between the body 206 and the other protection mechanism (overload diaphragm) 218. Similarly, a fill fluid 308 fills the gap between the barrier diaphragm 210 and the protection mechanism (overload diaphragm) 218. The fill fluid 308 is ported via the port 302 to both the high-pressure side of the sensor 204 and a gap between the body 206 and the other protection mechanism (overload diaphragm) 216.

During the application of low-side pressure, the pressure is transmitted from the barrier diaphragm 208 to the fill fluid 306 and then to the sensor 204 and to the gap between the other protection mechanism (overload diaphragm) 218 and the body 206. This causes the protection mechanism 218 to deflect away from the body 206, increasing the gap between the body 206 and the protection mechanism 218. Meanwhile, the gap between the barrier diaphragm 208 and the protection mechanism 216 is reduced. When sufficient fill fluid 306 has moved to eliminate the gap between the barrier diaphragm 208 and the protection mechanism 216, the barrier diaphragm 208 and the protection mechanism 216 nest together, and no additional pressure will be transmitted to the sensor 204, thus providing overpressure protection for the sensor 204.

In a similar manner, during the application of high-side pressure, the pressure is transmitted from the barrier diaphragm 210 to the fill fluid 308 and then to the sensor 204 and to the gap between the other protection mechanism (overload diaphragm) 216 and the body 206. This causes the protection mechanism 216 to deflect away from the body 206, increasing the gap between the body 206 and the protection mechanism 216. Meanwhile, the gap between the barrier diaphragm 210 and the protection mechanism 218 is reduced. When sufficient fill fluid 308 has moved to eliminate the gap between the barrier diaphragm 210 and the protection mechanism 218, the barrier diaphragm 210 and the protection mechanism 218 nest together, and no additional pressure will be transmitted to the sensor 204, thus providing overpressure protection for the sensor 204.

Although FIG. 3 illustrates one example of operation of a differential pressure sensor with overpressure protection, various changes may be made to FIG. 3. For example, the sizes, shapes, and relative dimensions of the components in FIG. 3 are for illustration only.

Figure 4:
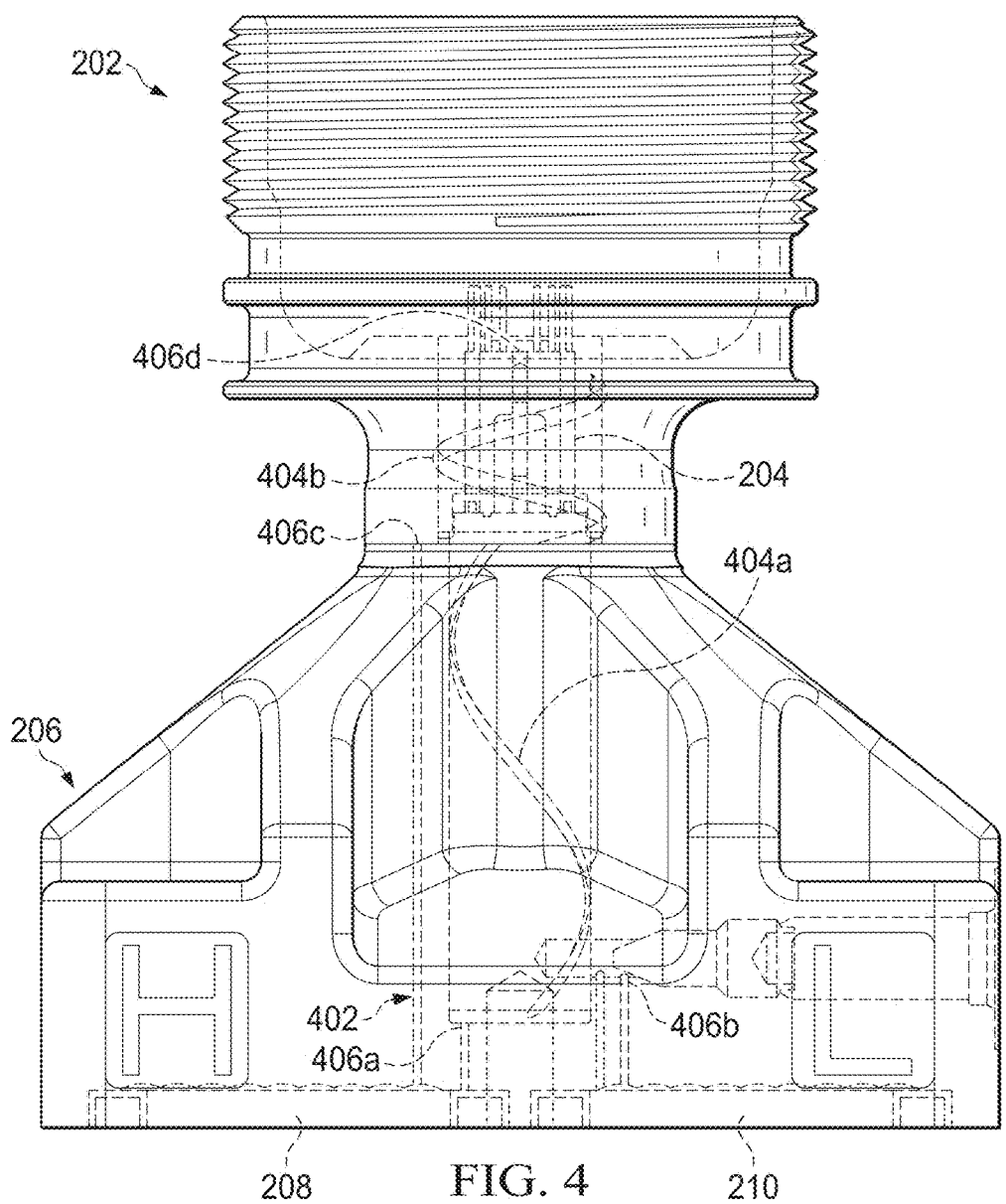
FIG. 4 illustrates example flow porting with an integral flame-proof safety mechanism in a pressure sensor according to this disclosure.

FIG. 4 illustrates example flow porting with an integral flame-proof safety mechanism in a pressure sensor 200 according to this disclosure. For ease of explanation, the flow porting shown in FIG. 4 is described with respect to the pressure sensor 200 of FIG. 2. However, the flow porting could be used with any other suitable pressure sensor.

In some embodiments, to help increase or maximize the accuracy of the pressure sensor 200, the volume of the fill fluid used in the body 206 can be minimized. As a result, internal flow paths (the passages 212 implementing the pressure ports 302 and 304) in the pressure sensor 200 have relatively small diameters and may contain a number of bends and curves.

As shown in FIG. 4, the body 206 can include a number of narrow passages for the fill fluid, at least some of which are curved or include bends. In this example, the passages 212 include one or more passages 402 that are generally straight but that are long and narrow, so these passages 402 have relatively small cross-sections relative to their lengths. The passages 212 also include narrow curved or helical passages 404a-404b, where the curved or helical passage 404a is longer than the curved or helical passage 404b. The curved or helical passages 404a-404b may be curved along substantially their entire lengths, and again the curved or helical passages 404a-404b have relatively small cross-sections relative to their lengths. In addition, some of the passages include a number of sharp bends 406a-406d, such as 90° turns.

Long and narrow passages with turns or bends are well-suited for arresting flames. This is because of (i) the large surface area relative to the volumetric flow path in a narrow and long passage and (ii) the turbulence generated in curved passages and 90° turns. These features are very effective at absorbing thermal energy in a flame front and extinguishing a flame.

Thus, flame arresting can be accomplished in the pressure sensor 200 using the long and narrow flow paths (at least some with curved passages and 90° turns) that serve "double duty," minimizing internal fill fluid volume and providing flame-proof functionality. The pressure sensor 200 can therefore inherently comply with flame-proof requirements without the need for incorporating flame arrestors or other components that add cost and increase the overall package size of the body 206.

Although FIG. 4 illustrates one example of flow porting with an integral flame-proof safety mechanism in a pressure sensor, various changes may be made to FIG. 4. For example, the sizes, shapes, and relative dimensions of the components in FIG. 4 are for illustration only. Also, the specific flow paths shown in FIG. 4 are examples only, and other arrangements of flow paths could be used.

Figure 5:
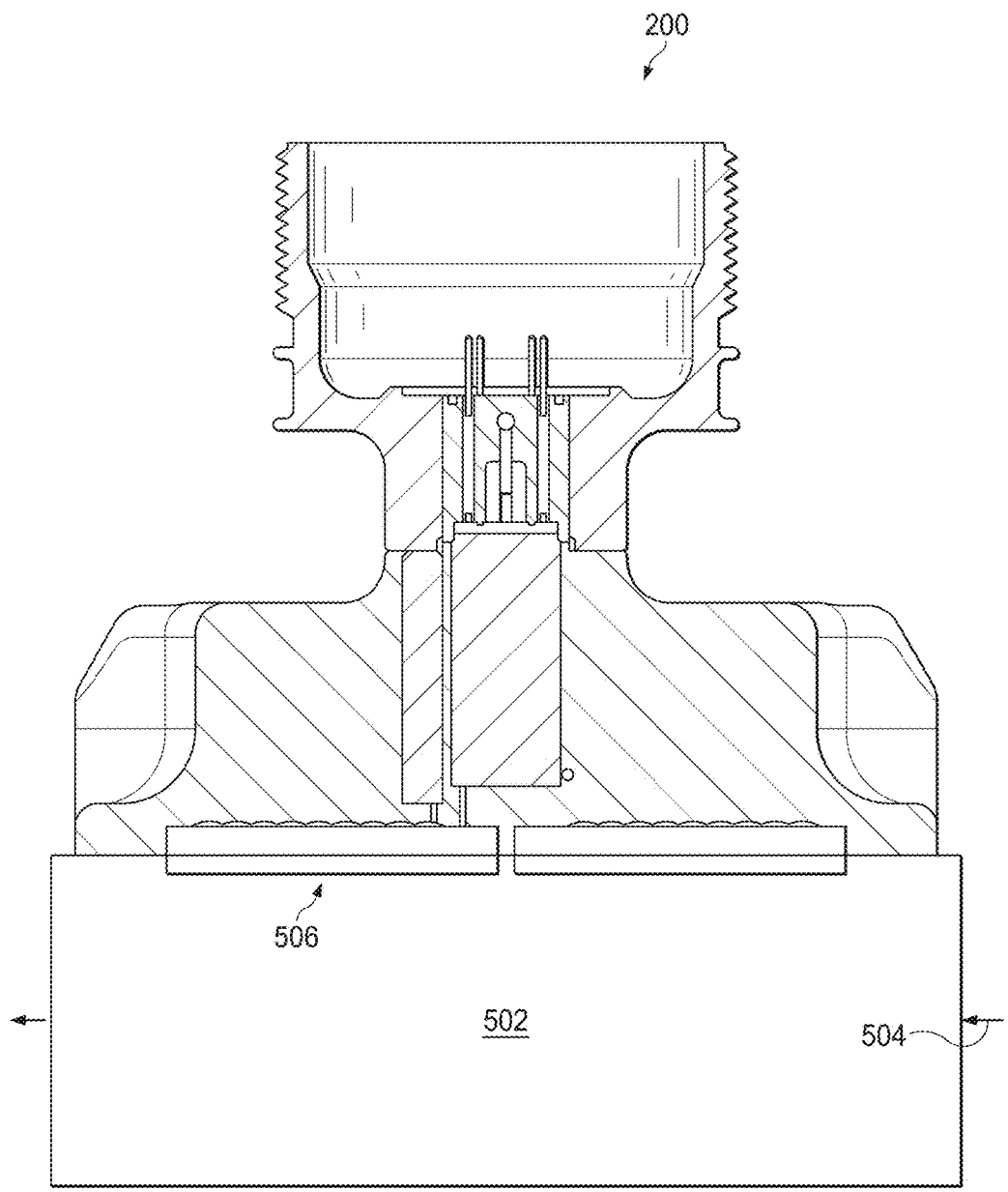
FIG. 5 illustrates an example use of a pressure sensor according to this disclosure.

FIG. 5 illustrates an example use of a pressure sensor according to this disclosure. For ease of explanation, the use shown in FIG. 5 is described with respect to the pressure sensor 200 of FIG. 2. However, the pressure sensor 200 could be used in any other suitable manner.

As shown in FIG. 5, the pressure sensor 200 is mounted directly to a manifold 502. The manifold 502 denotes any suitable structure that is configured to transport at least one process fluid 504. As noted above, the manifold 502 could be configured to transport one or more corrosive process fluids at high pressures. The manifold 502 could have any suitable size, shape, and dimensions and could be formed from any suitable material(s).

The pressure sensor 200 can be mounted directly to openings 506 of the manifold 502. The openings 506 could have any suitable size, shape, and dimensions and could be separated by any suitable distance. As noted above, for example, the manifold 502 could denote an industry-standard DIN manifold, and the barrier diaphragms 208 and 210 can be small enough and spaced apart to fit within the established bolt pattern for the DIN manifold.

Although FIG. 5 illustrates one example use of a pressure sensor 200, various changes may be made to FIG. 5. For example, the pressure sensor 200 could be used in any other suitable manner and need not be used with a manifold.

Figure 6:
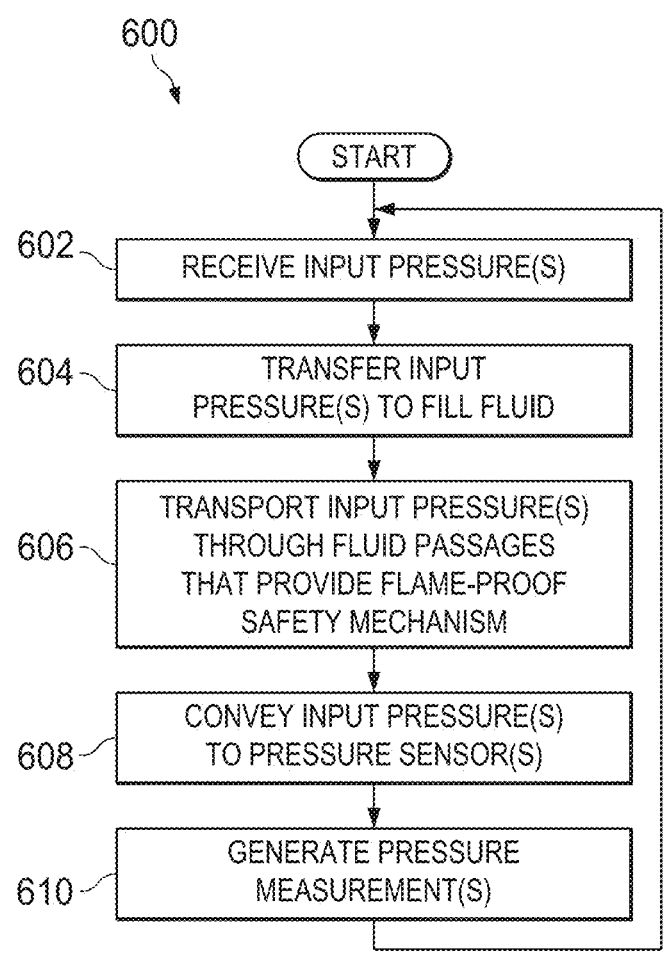
FIG. 6 illustrates an example method for pressure sensing using a pressure sensor having flow porting with integral flame-proof safety according to this disclosure.

FIG. 6 illustrates an example method 600 for pressure sensing using a pressure sensor having flow porting with integral flame-proof safety according to this disclosure. For ease of explanation, the method 600 shown in FIG. 6 is described with respect to the pressure sensor 200 of FIG. 2 having the internal flow porting as shown in FIG. 4. However, the method 600 could be used with any other suitable pressure sensor.

As shown in FIG. 6, one or more input pressures are received at step 602. This could include, for example, receiving input pressures at the barrier diaphragms 208 and 210 of the pressure sensor 200. As a particular example, this could include receiving input pressures at the barrier diaphragms 208 and 210 of the pressure sensor 200 through openings 506 of the manifold 502. The one or more input pressures are transferred to fill fluid at step 604. This could include, for example, the barrier diaphragms 208 and 210 transferring the input pressures to incompressible fill fluid 306 and 308.

The one or more input pressures are transported through various fluid passages at step 606. This could include, for example, the fill fluid 306 and 308 transporting the input pressures through the pressure ports 302 and 304, which include the passages 402, 404 and the passages with the bends 406a-406d. At least some of the fluid passages extend between the barrier diaphragms 208 and 210 and the sensor(s) 204, and some of the fluid passages could extend between the barrier diaphragms 208 and 210 to provide overpressure protection as shown in FIG. 4. Because of the long and narrow design of the fluid passages, as well as the curved or bent design of at least some of the fluid passages, the fluid passages provide an integral flame-proof safety mechanism in the pressure sensor 200.

The one or more input pressures are conveyed to one or more pressure sensors at step 608, and one or more pressure measurements are generated at step 610. This could include, for example, the at least one sensor 204 receiving the input pressure(s) from the fill fluid 306 and 308. This could also include the at least one sensor 204 generating an electrical signal whose voltage or current varies proportionally with the input pressure(s). This could further include different sensors 204 generating multiple pressure measurements, such as differential and static pressure measurements.

Although FIG. 6 illustrates one example of a method 600 for pressure sensing using a pressure sensor having flow porting with integral flame-proof safety, various changes may be made to FIG. 6. For example, while shown as a series of steps, various steps in FIG. 6 could overlap, occur in parallel, occur in a different order, or occur any number of times. Also, the method 600 could use other pressure sensors, including non-differential pressure sensors that do not receive multiple input pressures or include multiple pressure inputs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a sensor body including a low-pressure side and a high-pressure side;
   a sensor disposed between the low-pressure side and the high-pressure side and configured to measure pressure;
   at least one pressure input per each of the low-pressure side and the high-pressure side of the sensor body, in or on the sensor body, the at least one pressure input configured to provide at least one input pressure from at least one of the low-pressure side and the high-pressure side to the sensor; and
   multiple fluid passages configured to convey the at least one input pressure from the at least one pressure input from each of the low-pressure side and the high-pressure side to the sensor using a fill fluid;
   wherein the multiple fluid passages are configured to both (i) transport the fill fluid and (ii) absorb thermal energy in a flame created by the sensor before the flame exits the sensor body.

2. The apparatus of claim 1, wherein the fluid passages comprise:
   long and narrow straight passages;
   long and narrow curved or helical passages; and
   turns or bends.

3. The apparatus of claim 1, wherein the fluid passages have small cross-sections relative to their lengths.

4. The apparatus of claim 1, wherein the sensor comprises one of multiple sensors.

5. The apparatus of claim 1, wherein the sensor body is a coplanar meter body.

6. The apparatus of claim 1, wherein the apparatus comprises multiple pressure inputs configured to provide multiple pressures to the sensor.

7. The apparatus of claim 1, wherein each pressure input comprises:

a barrier diaphragm configured to move in response to pressure; and an overload diaphragm configured to limit movement of the barrier diaphragm.

8. The apparatus of claim 7, wherein:

the at least one pressure input comprises first and second pressure inputs; and the multiple fluid passages comprise:

at least one first passage configured to transport a first fill fluid between (i) a gap between the barrier diaphragm of the first pressure input and the overload diaphragm of the first pressure input and (ii) the sensor and a gap between the overload diaphragm of the second pressure input and the sensor body; and at least one second passage configured to transport a second fill fluid between (i) a gap between the barrier diaphragm of the second pressure input and the overload diaphragm of the second pressure input and (ii) the sensor and a gap between the overload diaphragm of the first pressure input and the sensor body.

9. A system comprising:

a manifold; and a pressure sensor mounted to the manifold, the pressure sensor comprising a sensor body including a low-pressure side and a high-pressure side;

a sensor disposed between the low-pressure side and the high-pressure side and configured to measure pressure;

at least one pressure input per each of the low-pressure side and the high-pressure side of the sensor body, in or on the sensor body, the at least one pressure input configured to provide at least one input pressure from at least one of the low-pressure side and the high-pressure side to the sensor; and multiple fluid passages configured to convey the at least one input pressure from the at least one pressure input from each of the low-pressure side and the high-pressure side to the sensor using a fill fluid;

wherein the multiple fluid passages are configured to both (i) transport the fill fluid and (ii) absorb thermal energy in a flame created by the sensor before the flame exits the sensor body.

10. The system of claim 9, wherein the fluid passages comprise:

long and narrow straight passages;

long and narrow curved or helical passages; and turns or bends.

11. The system of claim 9, wherein the fluid passages have small cross-sections relative to their lengths.

12. The system of claim 9, wherein the sensor comprises one of multiple sensors.

13. The system of claim 9, wherein the sensor body is a coplanar meter body.

14. The system of claim 9, wherein each pressure input comprises:

a barrier diaphragm configured to move in response to pressure; and an overload diaphragm configured to limit movement of the barrier diaphragm.

15. The system of claim 14, wherein:

the at least one pressure input comprises first and second pressure inputs; and the multiple fluid passages comprise:

at least one first passage configured to transport a first fill fluid between (i) a gap between the barrier diaphragm of the first pressure input and the overload diaphragm of the first pressure input and (ii) the sensor and a gap between the overload diaphragm of the second pressure input and the sensor body; and at least one second passage configured to transport a second fill fluid between (i) a gap between the barrier diaphragm of the second pressure input and the overload diaphragm of the second pressure input and (ii) the sensor and a gap between the overload diaphragm of the first pressure input and the sensor body.

16. A method comprising:

providing input pressure to a sensor disposed within a sensor body between a low-pressure side and a high-pressure side of the sensor body from at least one of a low-pressure input and a high-pressure input of the sensor body; and generating a pressure measurement using the sensor based on the input pressure;

wherein providing the input pressure comprises transporting fill fluid through multiple fluid passages configured to convey the input pressure from the at least one pressure input associated with each of the low-pressure side and the high-pressure side to the sensor; and wherein the multiple fluid passages are configured to both (i) transport the fill fluid and (ii) absorb thermal energy in a flame created by the sensor before the flame exits the sensor body.

17. The method of claim 16, wherein the fluid passages comprise:

long and narrow straight passages;

long and narrow curved or helical passages; and turns or bends.

18. The method of claim 16, wherein the fluid passages have small cross-sections relative to their lengths.

19. The method of claim 16, wherein each pressure input comprises:

a barrier diaphragm configured to move in response to pressure; and an overload diaphragm configured to limit movement of the barrier diaphragm.

20. The method of claim 19, wherein the multiple fluid passages comprise:

at least one first passage that transports a first fill fluid between (i) a gap between the barrier diaphragm of the first pressure input and the overload diaphragm of the first pressure input and (ii) the sensor and a gap between the overload diaphragm of the second pressure input and the sensor body; and at least one second passage that transports a second fill fluid between (i) a gap between the barrier diaphragm of the second pressure input and the overload diaphragm of the second pressure input and (ii) the sensor and a gap between the overload diaphragm of the first pressure input and the sensor body.

* * * * *